US008232333B2

(12) United States Patent
Haeger et al.

(10) Patent No.: US 8,232,333 B2
(45) Date of Patent: Jul. 31, 2012

(54) PROCESS FOR PRODUCING ULTRAFINE POWDERS BASED ON POLYAMIDES, ULTRAFINE POLYAMIDE POWDERS AND THEIR USE

(75) Inventors: Harald Haeger, Luedinghausen (DE); Franz-Erich Baumann, Duelmen (DE); Wolfgang Lortz, Waechtersbach (DE); Christoph Batz-Sohn, Hanau-Mittelbuchen (DE)

(73) Assignee: Evonik Degussa GmbH, Essen (DE)

( * ) Notice: Subject to any disclaimer, the term of this patent is extended or adjusted under 35 U.S.C. 154(b) by 370 days.

(21) Appl. No.: 12/089,998

(22) PCT Filed: Oct. 12, 2006

(86) PCT No.: PCT/EP2006/067308
§ 371 (c)(1),
(2), (4) Date: Apr. 11, 2008

(87) PCT Pub. No.: WO2007/051691
PCT Pub. Date: May 10, 2007

(65) Prior Publication Data
US 2008/0249237 A1    Oct. 9, 2008

(30) Foreign Application Priority Data
Nov. 4, 2005    (DE) .......................... 10 2005 053 071

(51) Int. Cl.
C08J 3/215    (2006.01)
C08J 3/12    (2006.01)
C08K 3/22    (2006.01)
C08K 5/49    (2006.01)

(52) U.S. Cl. ........ 523/340; 523/220; 524/115; 524/430; 524/904; 106/459

(58) Field of Classification Search .................. 523/220, 523/340; 524/115, 430, 904; 106/459
See application file for complete search history.

(56) References Cited

U.S. PATENT DOCUMENTS

| | | | |
|---|---|---|---|
| 4,226,637 A * | 10/1980 | Linden et al. ................. | 106/499 |
| 4,689,364 A * | 8/1987 | Mumcu et al. ................ | 524/497 |
| 5,447,791 A * | 9/1995 | Cunningham et al. ........ | 428/327 |
| 6,641,870 B2 | 11/2003 | Bartkowiak et al. | |
| 6,663,683 B2 | 12/2003 | Lortz et al. | |
| 6,676,719 B2 | 1/2004 | Lortz et al. | |
| 6,767,377 B2 | 7/2004 | Schumacher et al. | |
| 6,773,697 B2 | 8/2004 | Hemme et al. | |
| 6,773,814 B2 | 8/2004 | Schumacher et al. | |
| 6,808,769 B2 | 10/2004 | Batz-Sohn et al. | |
| 6,905,632 B2 | 6/2005 | Lortz et al. | |
| 6,991,190 B2 | 1/2006 | Lortz et al. | |
| 7,015,270 B2 | 3/2006 | Scharfe et al. | |
| 7,083,769 B2 | 8/2006 | Moerters et al. | |
| 7,135,525 B2 | 11/2006 | Petter et al. | |
| 7,148,286 B2 | 12/2006 | Baumann et al. | |
| 7,244,302 B2 | 7/2007 | Schumacher et al. | |
| 7,255,735 B2 | 8/2007 | Meyer et al. | |
| 7,317,044 B2 | 1/2008 | Monsheimer et al. | |
| 7,374,787 B2 | 5/2008 | Lortz et al. | |
| 7,399,487 B2 | 7/2008 | Batz-Sohn et al. | |
| 7,470,423 B2 | 12/2008 | Lortz et al. | |
| 7,538,142 B2 | 5/2009 | Lortz et al. | |
| 7,572,854 B2 | 8/2009 | Schneider et al. | |
| 7,615,577 B2 | 11/2009 | Lortz et al. | |
| 7,645,335 B2 | 1/2010 | Lortz et al. | |
| 7,749,322 B2 | 7/2010 | Schumacher et al. | |
| 7,780,777 B2 | 8/2010 | Perlet et al. | |
| 7,781,520 B2 | 8/2010 | Standke et al. | |
| 7,815,936 B2 | 10/2010 | Hasenzahl et al. | |
| 7,834,073 B2 | 11/2010 | Standke et al. | |
| 7,976,719 B2 | 7/2011 | Batz-Sohn et al. | |
| 8,012,367 B2 | 9/2011 | Hasenzahl et al. | |
| 8,039,110 B2 | 10/2011 | Jenkner et al. | |
| 2002/0197311 A1 | 12/2002 | Hasenzahl et al. | |
| 2003/0108580 A1 | 6/2003 | Hasenzahl et al. | |
| 2003/0130368 A1 * | 7/2003 | Fichou et al. .................... | 521/99 |
| 2003/0228271 A1 | 12/2003 | Batz-Sohn et al. | |
| 2004/0054070 A1 * | 3/2004 | Bouvy et al. .................. | 524/588 |

(Continued)

FOREIGN PATENT DOCUMENTS
DE    35 10 687    9/1986
(Continued)

OTHER PUBLICATIONS

U.S. Appl. No. 12/131,425, filed Jun. 2, 2008, Monsheimer, et al.
U.S. Appl. No. 12/089,926, filed Jun. 4, 2008, Haeger, et al.
U.S. Appl. No. 11/816,556, filed Jan. 28, 2008, Wursche, et al.
U.S. Appl. No. 12/105,672, filed Apr. 18, 2008, Simon, et al.
U.S. Appl. No. 12/192,208, filed Aug. 15, 2008, Goering, et al.
U.S. Appl. No. 13/257,488, filed Oct. 21, 2011, Standke, et al.
U.S. Appl. No. 13/256,557, filed Sep. 14, 2011, Scharfe, et al.

Primary Examiner — Tae H Yoon
(74) Attorney, Agent, or Firm — Oblon, Spivak, McClelland, Maier & Neustadt, L.L.P.

(57) ABSTRACT

Process for preparing ultrafine powders based on polyamides by contacting polyamides having a relative solution viscosity $\eta_{rel}$ in the range from 1.5 to 2.0, measured in 0.5% m-cresol solution at 25° C., with an alcoholic medium in the presence of inorganic particles under the action of pressure and/or temperature to generate an at least partial solution, and then precipitating the polyamide from the at least partial solution, characterized in that a suspension of the inorganic particles suspended in the alcoholic medium is used. The resulting ultrafine polyamide powders have a specific BET surface area in the range of 5-100 $m^2/g$; a fineness $d_{50}$ of less than 70 µm; an apparent density AD in the range from 250 to 1000 g/l; and a particle content of 0.1 to 80% by weight of inorganic particles based on the total weight of the polyamide powder. They are equally suitable for coatings and for moldings and components with improved mechanical properties.

15 Claims, No Drawings

U.S. PATENT DOCUMENTS

| | | |
|---|---|---|
| 2004/0102539 A1 | 5/2004 | Monsheimer et al. |
| 2004/0106691 A1 | 6/2004 | Monsheimer et al. |
| 2004/0137228 A1 | 7/2004 | Monsheimer et al. |
| 2004/0232583 A1 | 11/2004 | Monsheimer et al. |
| 2004/0240062 A1 | 12/2004 | Lortz et al. |
| 2005/0027050 A1 | 2/2005 | Monsheimer et al. |
| 2005/0169861 A1 | 8/2005 | Lortz et al. |
| 2005/0265934 A1 | 12/2005 | Schumacher et al. |
| 2006/0024097 A1* | 2/2006 | Yamada et al. ............... 399/327 |
| 2006/0071359 A1 | 4/2006 | Monsheimer et al. |
| 2006/0104881 A1 | 5/2006 | Lortz et al. |
| 2006/0134419 A1 | 6/2006 | Monsheimer et al. |
| 2006/0159635 A1 | 7/2006 | Meyer et al. |
| 2006/0159636 A1 | 7/2006 | Meyer et al. |
| 2006/0159637 A1 | 7/2006 | Meyer et al. |
| 2006/0163533 A1 | 7/2006 | Batz-Sohn et al. |
| 2006/0189784 A1 | 8/2006 | Monsheimer et al. |
| 2006/0202395 A1 | 9/2006 | Monsheimer et al. |
| 2006/0223928 A1 | 10/2006 | Monsheimer et al. |
| 2006/0229210 A1 | 10/2006 | Neugebauer et al. |
| 2006/0244169 A1 | 11/2006 | Monsheimer et al. |
| 2006/0281873 A1 | 12/2006 | Alting et al. |
| 2006/0292192 A1 | 12/2006 | Hasenzahl et al. |
| 2007/0013108 A1 | 1/2007 | Monsheimer et al. |
| 2007/0104971 A1 | 5/2007 | Wursche et al. |
| 2007/0110906 A1 | 5/2007 | Edelmann et al. |
| 2007/0126159 A1 | 6/2007 | Simon et al. |
| 2007/0166560 A1 | 7/2007 | Wursche et al. |
| 2007/0182070 A1 | 8/2007 | Monsheimer et al. |
| 2007/0183918 A1 | 8/2007 | Monsheimer et al. |
| 2007/0197692 A1 | 8/2007 | Monsheimer et al. |
| 2007/0231280 A1 | 10/2007 | Schumacher et al. |
| 2007/0232753 A1 | 10/2007 | Monsheimer et al. |
| 2007/0238056 A1 | 10/2007 | Baumann et al. |
| 2007/0297998 A1 | 12/2007 | Meyer et al. |
| 2008/0058489 A1 | 3/2008 | Edelmann et al. |
| 2008/0095724 A1 | 4/2008 | Hasenzahl et al. |
| 2008/0116616 A1 | 5/2008 | Monsheimer et al. |
| 2008/0119632 A1 | 5/2008 | Baumann et al. |
| 2008/0166496 A1 | 7/2008 | Monsheimer et al. |
| 2008/0166529 A1 | 7/2008 | Hager et al. |
| 2008/0187673 A1 | 8/2008 | Standke et al. |
| 2008/0206572 A1 | 8/2008 | Edelmann et al. |
| 2008/0213325 A1 | 9/2008 | Schumacher et al. |
| 2008/0213552 A1 | 9/2008 | Hager et al. |
| 2008/0217821 A1 | 9/2008 | Goring et al. |
| 2008/0221318 A1 | 9/2008 | Edelmann et al. |
| 2008/0249237 A1 | 10/2008 | Hager et al. |
| 2008/0264299 A1 | 10/2008 | Lortz et al. |
| 2009/0005518 A1 | 1/2009 | Just et al. |
| 2009/0007818 A1 | 1/2009 | Militz et al. |
| 2009/0022898 A1 | 1/2009 | Standke et al. |
| 2009/0030162 A1 | 1/2009 | Mueh et al. |
| 2009/0047225 A1 | 2/2009 | Hasenzahl et al. |
| 2009/0069464 A1 | 3/2009 | Standke |
| 2009/0131694 A1 | 5/2009 | Schumacher et al. |
| 2009/0186053 A1 | 7/2009 | Meyer et al. |
| 2009/0261309 A1 | 10/2009 | Lortz et al. |
| 2010/0117021 A1 | 5/2010 | Batz-Sohn et al. |
| 2010/0119851 A1 | 5/2010 | Giessler-Blank et al. |
| 2010/0159144 A1 | 6/2010 | Standke et al. |
| 2010/0191001 A1 | 7/2010 | Wassmer et al. |
| 2010/0209339 A1 | 8/2010 | Schumacher et al. |
| 2010/0209719 A1 | 8/2010 | Borup et al. |
| 2010/0233392 A1 | 9/2010 | Batz-Sohn et al. |
| 2010/0308287 A1 | 12/2010 | Lortz et al. |
| 2011/0143147 A1 | 6/2011 | Edelmann et al. |
| 2011/0144226 A1 | 6/2011 | Spyrou et al. |
| 2011/0259240 A1 | 10/2011 | Jenkner et al. |
| 2011/0268899 A1 | 11/2011 | Albert et al. |

FOREIGN PATENT DOCUMENTS

| | | |
|---|---|---|
| DE | 35 10 690 | 9/1986 |
| EP | 0 949 290 | 10/1990 |
| EP | 0 548 969 | 6/1993 |
| JP | 363243180 A * | 10/1988 |
| JP | 2005225735 A * | 8/2005 |
| JP | 2006084941 A * | 3/2006 |

* cited by examiner

PROCESS FOR PRODUCING ULTRAFINE POWDERS BASED ON POLYAMIDES, ULTRAFINE POLYAMIDE POWDERS AND THEIR USE

The present invention is in the field of fine polyamide powder.

In particular, the invention relates to a process for preparing ultrafine powders based on polyamides by contacting polyamides having a relative solution viscosity $\eta_{rel}$ in the range from 1.5 to 2.0, measured in 0.5% m-cresol solution at 25° C., with an alcoholic medium in the presence of inorganic particles under the action of pressure and/or temperature to generate an at least partial solution, and then precipitating the polyamide from the at least partial solution. The invention also includes fine polyamide powders which have a high BET surface area and an apparent density which is within the range of standard precipitated polyamide powders, and also the use of the fine polyamide powders.

Powders based on polyamide, for example for coatings or for obtaining mouldings, are notable for their high chemical resistance and very good mechanical properties. Powders which are obtained by reprecipitation from ethanolic solution, for example according to DE-A 2905547, are superior with regard to their processing performance to those products which are obtained from a grinding process, for example according to DE-A 1570392, since the precipitation leads to rounder and hence better fluidizable particles. Moreover, ground powders as obtained, for example, also according to DE-C 2855920 have a broad particle size distribution, which in turn causes a high level of classifying complexity. A further advantage of the precipitated powders is the wide range of variation in the molecular weight ($\eta_{rel}$=1.5-2.0), while ground powders are producible in an economically viable manner only at an $\eta_{rel}$<1.7.

The fine polyamide powders should ideally satisfy a whole series of requirements. For instance, it would be desirable to amalgamate a high BET surface area with a large apparent density combined with sufficient fineness of the powders.

For example, a high BET surface area would be desirable in many cases in order to improve the adhesion of the powder with respect to surfaces to be coated, or in order thus to lead to improved incorporation of pigments or additives of all types.

In the so-called laser sintering process for producing components from fine polyamide powders too, a high BET surface area is advantageous, since the possibility of adhesion between the powder particles can thus be increased.

Unfortunately, however, the advantages of a high BET surface area have to date necessarily been associated with an apparent density which complicates frictionless processing in existing processes. Normally, high apparent density and high BET surface area are two contradictory requirements. Powders based on polyamide which satisfy both requirements cannot be prepared according to the current state of the art. Although DE-A 19708956 describes fine polyamide powders with high apparent density which have been obtained by a two-stage precipitation process, these powders still have a low BET surface area.

Although combinations of polyamide powders with inorganic pigments (e.g. titanium dioxide) have a high apparent density, they are neither fine powders nor exhibit a high BET surface area.

The mere presence of particulate substances during the reprecipitation of polyamides is just as unlikely to lead to the desired combination of properties. Thus, DE-A 3510690 discloses polyamide powders which are obtained by a precipitation process from ethanol, according to the examples of said DE-A 3510690, inter alia, in the presence of white pigment (particulate titanium dioxide). However, measurements show that powders obtained according to this example have either relatively good apparent densities in conjunction with very low BET surface area, or sufficient BET surface area but at the expense of a no longer sufficiently high apparent density. A fine polyamide powder having a combination of high BET surface area and an apparent density between 250 and 1000 g/l is not made obtainable by DE-A 3510690.

In view of the prior art detailed, it is an object of the invention to specify a process for preparing fine powders based on polyamide which, with sufficient fineness, couple a high BET surface area with sufficiently good processibility, i.e. an apparent density within the desired range.

It is a further object to provide fine polyamide powders having a high BET surface area in combination with sufficiently high apparent density.

It is another object to specify possible uses of the inventive fine polyamide powders. Thus, the fine powders based on polyamide should, by simple known processes, make available components and mouldings which possess increased strength values such as modulus of elasticity or tensile strength, but also very good impact resistance properties.

These objects, and further objects which are not specified in detail but which are immediately evident from the discussion of the prior art, are solved by a process having the features of claim 1. With regard to the product, the independent claim of the appropriate category specifies a solution to the object of the invention. With regard to the possible uses, solutions are disclosed by the appropriate claims.

By using, in a process for preparing ultrafine powders based on polyamides by contacting polyamides having a relative solution viscosity $\eta_{rel}$ in the range from 1.5 to 2.0, measured in 0.5% m-cresol solution at 25° C., with an alcoholic medium in the presence of inorganic particles under the action of pressure and/or temperature to generate an at least partial solution, and then precipitating the polyamide from the at least partial solution, a suspension of the inorganic particles in the alcoholic medium, it is possible in a manner which is not directly foreseeable to make available for the first time fine powders based on polyamide which satisfy the property profile discussed at the outset.

In the context of the invention, processible fine polyamide powders with high apparent density and high BET surface area can be obtained by performing the polyamide precipitation (reprecipitation of the polyamide) in an alcoholic suspension which contained inorganic particles. In contrast to DE-A 3510690, in which, for example, a precipitation was also performed in the presence of particles (white pigment), a suspension of the particles is generated in the process according to the invention and the reprecipitation of the polyamide is performed in the presence of this suspension of the particles. A surprising result obtained here is an optimally processible fine polyamide powder having the desired properties with regard to BET surface area and apparent density.

The inventive procedure results in fine polyamide powders in combination with inorganic particles.

The use of inorganic particles which are present in suspension in an alcoholic medium is of particular significance for the process of the invention. In a preferred process variant, the process is characterized in that a suspension is used which comprises inorganic particles having a mean particle size $d_{50}$ in the range from 0.001 to 0.8 μm, measured in suspension in the alcoholic medium as the volume-weighted median value of the peak analysis by means of static or dynamic light scattering, suspended in the alcoholic medium. Even more preferably, suspensions of inorganic particles are used, the particles having a size $d_{50}$ in the range from 0.005 to 0.5 µm and most preferably in the range from 0.01 to 0.3 µm. The particle size as specified is determined by known measurement methods by means of static or dynamic light scattering in the suspension. The values obtained via light scattering processes may be isolated particles or else agglomerates of primary particles in the suspension. What is important for the invention is that the particles actually present in the suspension, whether they be primary particles or agglomerates, have a $d_{50}$ value within the range specified. The particle size can be measured, for example, with a Zetasizer 3000 Hsa (Malvern Instruments, UK). When the particle size is above a $d_{50}$ value of 0.8 µm, the risk that no fine powders result is great. In the reprecipitation, the result under some circumstances might then be excessively large polyamide powder particles.

The nature of the compounds usable as inorganic particles in the context of the invention can vary over a wide range. Processes of great interest are those in which a suspension is used which comprises inorganic particles selected from the group consisting of $Al_2O_3$, $TiO_2$, $ZrO_2$, $SiO_2$, $ZnO$, $Bi_2O_3$, $CeO_2$, ITO (indium oxide doped with tin(IV) oxide), ATO (tin(IV) oxide doped with antimony oxide), IZO (indium oxide doped with zinc oxide), boron nitride, boron carbide, mixed oxides and spinels, suspended in the alcoholic medium. Particular preference is given to the use of aluminium oxide ($Al_2O_3$).

In this connection, the aluminium oxide may preferably be of pyrogenic origin. Pyrogenic means that corresponding aluminium oxide powder is obtained by reacting a suitable starting material in a flame. Pyrogenic processes include flame oxidation and flame hydrolysis. A particular process used for the industrial scale preparation of aluminium oxide is the flame hydrolysis of aluminium chloride in a hydrogen/oxygen flame. In general, the aluminium oxide particles prepared in this way are present in the form of aggregated primary particles, the primary particles being free of pores and bearing hydroxyl groups on their surface. In the reaction of aluminium chloride to give aluminium oxide, a by-product formed is hydrochloric acid which adheres to the aluminium oxide particles. Commonly, a majority of the hydrochloric acid is removed from the particles by a treatment with steam.

Aluminium oxide powders particularly suitable for the invention include: AEROXIDE® Alu C, AEROXIDE® Alu 65, AEROXIDE® Alu 130, all Degussa AG, SpectrAl™ 100 Fumed Alumina, SpectrAl™ 51 Fumed Alumina, SpectrAl™ 81 Fumed Alumina, all Cabot Corp.

An appropriate process variant envisages the use of a suspension which is obtainable by suspending inorganic particles having a specific surface area in the range from 5 to 200 $m^2/g$ in the alcoholic medium.

The inorganic particles are used in the form of a suspension in alcoholic medium. To obtain a suspension, the particles are distributed finely in the alcoholic medium. This is done by processes known per se. Particular preference is given to processes which enable a high energy input. Such processes are described, for example, in German Patent Application 103 60 766 or German Patent Application 10 2005 032 427.4.

In a preferred embodiment, the process of the invention is characterized in that a suspension is used which is obtainable by suspending the inorganic particles in the alcoholic medium with introduction of an energy input of greater than 1000 $kJ/m^3$. This generally gives rise to very usable suspensions of the particles in the alcohol. The energy input addressed can be accomplished by known units. Suitable units may be: planetary kneaders, rotor-stator machines, stirred ball mills, roll mills and the like.

A particularly suitable procedure has been found to be one in which the suspension is first prepared with an energy input of less than 1000 $kJ/m^3$ to form a presuspension, the presuspension is divided into at least two substreams, these substreams are placed under a pressure of at least 500 bar in a high-energy mill, decompressed through a nozzle and allowed to meet one another in a gas-or liquid-filled reaction chamber, and the high-energy grinding is optionally repeated once or more than once.

The amount of inorganic particles in the suspension can vary over a wide range. Depending on the particle type, size of the inorganic particles and specific nature of the alcoholic medium, relatively small or relatively large solids contents may be advisable. In general, it will, however, be appropriate to use very solids-rich suspensions for the purposes of the invention. In an advantageous process modification, a suspension is used which has a content of particles in the range from 10 to 60% by weight based on the total weight of the suspension. Suspensions which are usable particularly favourably include those having a solids content of from 15 to 50% by weight, even more appropriately from 20 to 50% by weight.

The suspensions of inorganic particles in alcoholic media involved in the process according to the invention should be highly stable. In the context of the invention, particularly stable is understood to mean the stability of the suspension against sedimentation and reagglomeration within a period of one month, generally of at least six months.

To achieve particularly stable suspensions, it has also been found to be particularly advantageous when, in the distribution of the inorganic particles in the alcoholic medium, additives are present which can stabilize the suspension.

Such additives are, for example, phosphoric acid and its mono-or dibasic phosphates, phosphoric esters, phosphonic acids, organically modified phosphonic acid, sulphuric acid and derivatives thereof, nitric acid, generally organic mineral acids. In addition, it is also possible to use organic compounds having acidic protons, for example carboxylic acids or phenols. Basic organic compounds, for example based on amines, are also suitable.

The suspensions utilizable for the invention are generated in an alcoholic medium. This may be a pure alcohol, a mixture of a plurality of alcohols or else alcohols having a content of water or other substances which essentially do not disadvantageously influence the desired reprecipitation of the polyamides. The alcoholic medium of the inventive suspensions preferably has a content of less than 50% by weight of nonalcoholic substances (preferably water), more preferably less than 10% by weight and particularly appropriately less than 1% by weight of extraneous, nonalcoholic substances. Useful substances for the invention are generally all types of alcohols or mixtures thereof which permit reprecipitation of the polyamides under the desired conditions (pressure and temperature). In the individual case, it is possible for the person skilled in the art to adjust the system to specific requirements without any great complication. For the process of the invention, the alcoholic medium used for the reprecipitation of the polyamide and/or the suspension of the inorganic particles is preferably one or more alcohols which have a numerical ratio of oxygen atoms to carbon atoms in the range from 1:1 to 1:5.

Typical alcohols for preparing the suspension of the inorganic particles are those having a ratio of oxygen to carbon of 1:1, 1:2, 1:3, 1:4 and 1:5, preferably those having an oxygen to carbon ratio of 1:2 and 1:3, more preferably having an oxygen to carbon ratio of 1:2. Very particularly appropriately, ethanol is used in the preparation of a suspension of the inorganic particles, and in the reprecipitation of the polyamides.

The polyamides reprecipitable in accordance with the invention (i.e., therefore, compounds usable as starting materials) are the entire range of known and available substances. Polyamides usable with preference as the starting material for the process of the invention include nylon-11, nylon-12 and polyamides having more than 12 aliphatically bonded carbon atoms per carboxamide group, preferably nylon-12. It is also possible to use the corresponding copolyamides or mixtures of homo-and copolyamides which contain at least 70 percent by weight of the units mentioned. As comonomers, they may accordingly contain from 0 to 30 percent by weight of one or more comonomers, such as caprolactam, hexamethylenediamine, 2-methylpentane-1,5-diamine, octamethylene-1,8-diamine, dodeca-methylenediamine, isophoronediamine, trimethylhexamethylenediamine, adipic acid, suberic acid, azelaic acid, sebacic acid, dodecanedioic acid, aminoundecanoic acid. The homo-and copolyamides referred to hereinafter as polyamides are used in the form of granules or pellets, which possess a relative solution viscosity between 1.5 and 2.0 (measured in 0.5% m-cresol solution at 25° C. to DIN 53 727), preferably between 1.70 and 1.95. They can be prepared by polycondensation, hydrolytic or acidolytic or activated anionic polymerization by known processes. Preference is given to using unregulated polyamides with $NH_2$/COOH end group ratios=from 40/60 to 60/40. The use polyamide may contain not more than 0.2 percent by weight of $H_3PO_4$. Preference is given to using $H_3PO_4$-free polyamides. However, it may also be appropriate to use regulated polyamides, preferably those in which the $NH_2$/COOH end group ratio of 90:10 and 80:20 or 10:90 and 20:80 is present.

The solution of the polyamides for reprecipitation can be prepared in all known ways. What is advantageous is substantially complete dissolution of the polyamide in the alcoholic medium in the presence of the suspension of inorganic particles. The dissolution can be promoted by use of pressure and/or temperature. The procedure is appropriately to initially charge the polyamide in the alcoholic medium and to dissolve it over the time needed under the action of elevated temperature. The suspension of the inorganic particles can be added before, during or after the dissolution of the polyamide. Appropriately, the suspension of the inorganic particles is initially charged at the same time as the polyamide. The dissolution operation is favourably promoted by the use of appropriate stirrer units. The precipitation of the polyamide can likewise be supported by use of pressure and/or temperature. For instance, a lowering of the temperature and/or distillative removal (preferably under reduced pressure) of the solvent, i.e. of the alcoholic medium, lead to the precipitation of the polyamide. However, it is also possible to support the precipitation by addition of an antisolvent (precipitant).

The invention also provides an ultrafine powder based on polyamides, obtainable by contacting polyamides having a relative solution viscosity $\eta_{rel}$ in the range from 1.5 to 2.0, measured in 0.5% m-cresol solution at 25° C., with a suspension of inorganic particles in an alcoholic medium under the action of pressure and/or temperature to generate an at least partial solution, and then precipitating the polyamide from the at least partial solution, the polyamide powder being characterized by a specific BET surface area in the range of 5-100 $m^2$/g, preferably 10-25 $m^2$/g; a fineness $d_{50}$ of less than 70 µm; an apparent density AD in the range from 250 to 1000 g/l; and a particle content of 0.1 to 80% by weight, preferably from 1 to 60% by weight, of inorganic particles based on the total weight of the polyamide powder.

The BET surface area is determined to DIN 66131 by absorption of nitrogen according to Brunauer-Emmett-Teller.

The fineness $d_{50}$ is determined by light scattering in a laser beam with a Malvern Mastersizer S Version 2.18.

The apparent density is determined to DIN 53644.

The particle content is determined by an ash/ignition residue determination to DIN EN ISO 3451 Part 1 and Part 4.

The solution viscosity was determined in 0.5% metacresol solution to DIN 307.

Preferred precipitated powders have apparent densities in the range from 250 to 800 g/l and more preferably between 300 and 500 g/l. Within these ranges, there is optimal processibility.

The fine polyamide powders of the invention feature a unique combination of properties. In addition to the properties mentioned, they also possess a relatively narrow particle size distribution, which is evident from the examples. Owing to their outstanding properties, the powders are suitable for a whole series of applications.

One preferred use of the ultrafine powder based on polyamides comprises the use as a coating composition. The powders give rise to impeccable coatings by all known and suitable coating processes. It is possible to produce either fluidized-bed sintering powders or electrostatic powders. Thus, even in the coating of difficult metal parts, the precipitated powders exhibit excellent properties with regard to stretchability and edge coatings, and also stability toward alkaline aqueous solutions. The mechanical strength of the coatings is at an excellent level.

The precipitated powders of the invention are equally outstandingly suitable for the production of mouldings and components. Materials made from inventive fine polyamide powders otherwise also have outstanding mechanical properties. For instance, the inventive fine powders exhibit not only increased strength values such as modulus of elasticity or tensile strength, but also very good impact strength properties.

The invention therefore also encompasses the use of the ultrafine powder based on polyamides to produce mouldings and/or components of various shapes and structures. In this case, one possibility is to proceed from the powder itself and to produce the mouldings or components directly by known deformation processes, preferably by injection moulding, extrusion or blow moulding.

Alternatively, the powders can also first be granulated and then processed thermoplastically, again by processes known per se, i.e. essentially by means of injection moulding, extrusion or blow moulding.

The invention will be illustrated in detail below with reference to examples and comparative examples.

Tests

Preparation of Suspensions of the Inorganic Particles in Alcoholic Medium (Ethanol) to be Used in the Process Of the Invention Suspension 1 (S1):

A 100 l stainless steel batch vessel is initially charged with 77 kg of ethanol. Subsequently, with running Ystral Conti-TDS 3 (stator slot: 4 mm ring and 1 mm ring, rotor/stator distance approx. 1 mm) under shear conditions, 23 kg of AEROXIDE® Alu C (BET 100 $m^2$/g) from Degussa are introduced into the batch vessel. Once the addition has ended, shearing is continued at 3000 rpm for another 30 min.

This presuspension is conducted in two passes through the Sugino Ultimaizer HJP-25050 high-energy mill at a pressure of 2500 bar and diamond dies of diameter 0.25 mm and thereby intensively ground further.

The addition of 85% phosphoric acid, so as to attain a concentration of 2% pure $H_3PO_4$ based on the $Al_2O_3$, was effected during the preparation of the presuspension in the dissolver.

After the suspension, a mean particle size $d_{50}$ of 0.18 μm was determined by dynamic light scattering (Zetasizer 3000 Hsa from Malvern Instruments, UK). The volume-weighted median value of the peak analysis is reported.

Suspension 2 (S2):

A 100 l stainless steel batch vessel is initially charged with 44 kg of ethanol and 1.00 kg of $H_3PO_4$ (85%). Subsequently, with running Ystral Conti-TDS 3 (stator slot: 4 mm ring and 1 mm ring, rotor/stator distance approx. 1 mm) under shear conditions, 21 kg of AEROXIDE® Alu C (BET 100 $m^2/g$) from Degussa are introduced into the batch vessel. Once approx. 18 kg of AEROXIDE® Alu C had been added, a further 0.13 kg of $H_3PO_4$ (85%) was added, in order again to achieve a low viscosity. Once the addition has ended, shearing is continued at 3000 rpm for another 30 min. At shear time 25 min, a further 1.2 kg of $H_3PO_4$ (85%) are added, so that a concentration of 11% $H_3PO_4$ (85%) based on the $Al_2O_3$ is achieved.

This presuspension is conducted in two passes through the Sugino Ultimaizer HJP-25050 high-energy mill at a pressure of 2500 bar and diamond dies of diameter 0.25 mm and thereby intensively ground further. After the suspension, a particle size $d_{50}$ of 0.14 μm was determined by dynamic light scattering (Zetasizer 3000 Hsa from Malvern Instruments, UK). The volume-weighted median value of the peak analysis is reported.

Suspension 3 (S3):

A 100 l stainless steel batch vessel is initially charged with 77 kg of ethanol. Subsequently, with running Ystral Conti-TDS 3 (stator slot: 4 mm ring and 1 mm ring, rotor/stator distance approx. 1 mm) under shear conditions, 23 kg of AEROXIDE® Alu C (BET 100 $m^2/g$) from Degussa are introduced into the batch vessel. Once the addition has ended, shearing is continued at 3000 rpm for another 30 min.

This presuspension is conducted in two passes through the Sugino Ultimaizer HJP-25050 high-energy mill at a pressure of 2500 bar and diamond dies of diameter 0.25 mm and thereby intensively ground further.

The phosphoric acid was added during the preparation of the suspension in the dissolver. After passage through the high-energy mill, for further stabilization, Cublen P 50 (a commercial product from Schwarz and Zschimmer GmbH, a 50% solution of 2-phosphonobutane-1,2,4-tricarboxylic acid in water) was added in such an amount that a concentration of 2% by weight of Cublen P 50 based on the amount of $Al_2O_3$ is achieved.

After the suspension, a particle size $d_{50}$ of 0.13 μm was determined by static light scattering (Zetasizer 3000 Hsa from Malvern Instruments, UK). The volume-weighted median value of the peak analysis is reported.

Suspension 4 (S4):

A 100 l stainless steel batch vessel is initially charged with 77 kg of ethanol. Subsequently, with running Ystral Conti-TDS 3 (stator slot: 4 mm ring and 1 mm ring, rotor/stator distance approx. 1 mm) under shear conditions, 23 kg of AEROXIDE® Alu C (BET 100 $m^2/g$) from Degussa are introduced into the batch vessel. Once the addition has ended, shearing is continued at 3000 rpm for another 30 min.

This presuspension is conducted in two passes through the Sugino Ultimaizer HJP-25050 high-energy mill at a pressure of 2500 bar and diamond dies of diameter 0.25 mm and thereby intensively ground further.

For stabilization, 85% phosphoric acid is now added with intensive mixing to the suspension obtained, so that a concentration of 2% pure $H_3PO_4$, based on the amount of $Al_2O_3$, is achieved, and Cublen P 50 (a commercial product from Schwarz and Zschimmer GmbH, a 50% solution of 2-phosphonobutane-1,2,4-tricarboxylic acid in water) is added in such an amount that a concentration of 2% by weight of Cublen P 50 based on the amount of $Al_2O_3$ is achieved.

After the suspension, a particle size $d_{50}$ of 0.06 μm was determined by static light scattering (Zetasizer 3000 Hsa from Malvern Instruments, UK). The volume-weighted median value of the peak analysis is reported.

Suspension 5 (S5):

A 100 l stainless steel batch vessel is initially charged with 77 kg of ethanol. Subsequently, with running Ystral Conti-TDS 3 (stator slot: 4 mm ring and 1 mm ring, rotor/stator distance approx. 1 mm) under shear conditions, 23 kg of VP zirconium oxide PH from Degussa are introduced into the batch vessel. Once the addition has ended, shearing is continued at 3000 rpm for another 30 min.

This presuspension is conducted in two passes through the Sugino Ultimaizer HJP-25050 high-energy mill at a pressure of 2500 bar and diamond dies of diameter 0.25 mm and thereby intensively ground further.

The phosphoric acid was again added during the suspension in the dissolver, while the amount of 2% by weight of Cublen P 50 (a commercial product from Schwarz and Zschimmer GmbH, a 50% solution of 2-phosphonobutane-1,2,4-tricarboxylic acid in water), based on the overall suspension, is added for subsequent stabilization.

After the suspension, a particle size $d_{50}$ of 0.08 μm was determined by static light scattering (Zetasizer 3000 Hsa from Malvern Instruments, UK). The volume-weighted median value of the peak analysis is reported.

Preparation of Fine Polyamide Powders with High Apparent Density and Low Bet Surface Area (Noninventive Comparative Example A-D).

COMPARATIVE EXAMPLE A

Two-Stage Reprecipitation of Unregulated PA 12

50 kg of unregulated PA 12 prepared by hydrolytic polymerization and having a relative solution viscosity of 1.62 and an end group content of 75 mmol/kg of COOH and 69 mmol/kg of $NH_2$ are brought to 145° C. in a 0.8 $m^3$ stirred tank together with 310 l of ethanol, denatured with 2-butanone and water content 1%, within 5 hours, and left at this temperature for 1 hour with stirring (paddle stirrer, d=80 cm, speed=49 rpm). Subsequently, the jacket temperature is reduced to 124° C. and, while continuously distilling off the ethanol, the internal temperature is brought to 125° C. with the same stirrer speed at a cooling rate of 25 K/h. From now on, the jacket temperature is kept 2 K-3 K below the internal temperature at the same cooling rate. The internal temperature is brought to 117° C. with the same cooling rate and then kept constant for 60 minutes. Thereafter, distillative removal is continued at a cooling rate of 40 K/h and the internal temperature is thus brought to 111° C. At this temperature, precipitation sets in, noticeable by the evolution of heat. The distillation rate is increased to such an extent that the internal temperature does not rise above 111.3° C. After 25 minutes, the internal temperature falls, which indicates the end of precipitation. Further distillative removal and cooling via the jacket brings the temperature of the suspension to 45° C., and the suspension is then transferred to a paddle dryer.

The ethanol is distilled off at 70° C./400 mbar, and the residue is then dried at 20 mbar/86° C. for 3 hours.

COMPARATIVE EXAMPLE B

Two-Stage Reprecipitation of PA 1010

In accordance with Example A, 50 kg of a PA 1010 specimen which has been obtained by polycondensation of 1,10-decanediamine and sebacic acid and has the following data is reprecipitated:
$\eta_{rel}$=1.84, [COOH]=62 mmol/kg, [NH$_2$]=55 mmol/kg.
The Precipitation Conditions are Altered Compared to Example A as Follows:
Dissolution temperature: 155° C., nucleation temperature/time: 128° C./60 min
Precipitation temperature: 120° C., precipitation time: 1 hour, stirrer speed: 90 rpm

COMPARATIVE EXAMPLE C

Two-Stage Reprecipitation of PA 1212

In accordance with Example A, 50 kg of a PA 1212 granule specimen which has been obtained by polycondensation of 1,10-decanediamine and dodecanedioic acid and has the following data is reprecipitated:
$\eta_{rel}$=1.80, [COOH]=3 mmol/kg, [NH$_2$]=107 mmol/kg.
The Precipitation Conditions are Altered Compared to Example A as Follows:
Dissolution temperature: 155° C., nucleation temperature: 123° C., nucleation time: 60 min
Precipitation temperature: 117° C., precipitation time: 60 minutes, stirrer speed: 110 rpm

COMPARATIVE EXAMPLE D

One-Stage Reprecipitation of Unregulated PA 12 According to DE-A 3510690 in the Presence of White Pigment 50 kg of unregulated PA 12 prepared by a hydrolytic polymerization and having a relative solution viscosity of 1.62 and an end group content of 75 mmol/kg of COOH and 69 mmol/kg of NH$_2$, and also 3 kg of titanium dioxide pigment (Kerr-McGee R-FK 3), together with 310 l of ethanol denatured with 2-butanone and water content 1%, are brought to 152° C. in a 3 m$^3$ stirred tank (d=160 cm) within 5 hours and left at this temperature with stirring (paddle stirrer, d=80 cm, speed=80 rpm) for 1 hour. The jacket temperature is then reduced to 124° C. and, while continuously distilling off the ethanol, the internal temperature is brought to 125° C. with a cooling rate of 25 K/h at the same stirrer speed. From now on, the jacket temperature is kept 2 K-3 K below the internal temperature at the same cooling rate until, at 108° C., precipitation, recognizable by the evolution of heat, sets in. The distillation rate is increased to such an extent that the internal temperature does not rise above 109.7° C. After 20 minutes, the internal temperature declines, which indicates the end of the precipitation. Further distillative removal and cooling via the jacket brings the temperature of the suspension to 45° C., and the suspension is then transferred to a paddle dryer.

The ethanol is distilled off at 70° C./500 mbar, and the residue is then dried at 20 mbar/86° C. for 3 hours.

The preparation of fine polyamide powders with high apparent density and high BET surface area is illustrated hereinafter with reference to examples. The results are compiled in Table 1.

EXAMPLE 1

One-Stage Reprecipitation of Unregulated PA 12 Analogously to DE-A 3510690, but with Use of Suspension S1

50 kg of unregulated PA 12 prepared by a hydrolytic polymerization and having a relative solution viscosity of 1.62 and an end group content of 75 mmol/kg of COOH and 69 mmol/kg of NH$_2$, together with 290 l of ethanol denatured with 2-butanone and water content 1% and 17.4 kg of S1, are brought to 145° C. in a 0.8 m$^3$ stirred tank within 5 hours and left at this temperature with stirring (paddle stirrer, d=80 cm, speed=85 rpm) for 1 hour. The jacket temperature is then reduced to 124° C. and, while continuously distilling off the ethanol, the internal temperature is brought to 125° C. with a cooling rate of 25 K/h at the same stirrer speed. From now on, the jacket temperature is kept 2 K-3 K below the internal temperature at the same cooling rate until, at 109° C., precipitation, recognizable by the evolution of heat, sets in. The distillation rate is increased to such an extent that the internal temperature does not rise above 109.3° C. After 20 minutes, the internal temperature declines, which indicates the end of the precipitation. Further distillative removal and cooling via the jacket brings the temperature of the suspension to 45° C., and the suspension is then transferred to a paddle dryer. The ethanol is distilled off at 70° C./500 mbar, and the residue is then dried at 20 mbar/86° C. for 3 hours.

EXAMPLE 2

One-Stage Reprecipitation of Unregulated PA 12 with Addition of Suspension S2

The procedure was analogous to Example 1. 17.4 kg of suspension S2 were used.

EXAMPLE 3

One-Stage Reprecipitation of Unregulated PA 12 with Addition of Suspension S2

The procedure was analogous to Example 1. 34.8 kg of suspension S2 were used. The amount of ethanol in the batch was reduced from 290 l to 275 l.

EXAMPLE 4

One-Stage Reprecipitation of Unregulated PA 12 with Addition of Suspension S3

The procedure was analogous to Example 1. 17.4 kg of suspension S3 were used.

EXAMPLE 5

One-Stage Reprecipitation of Unregulated PA 12 with Addition of Suspension S3

The procedure was analogous to Example 1. 34.8 kg of suspension S3 were used. The amount of ethanol in the batch was reduced from 290 l to 275 l.

EXAMPLE 6

One-Stage Reprecipitation of Unregulated PA 12 with Addition of Suspension S4

The procedure was analogous to Example 1. 17.4 kg of suspension S4 were used.

EXAMPLE 7

One-Stage Reprecipitation of Unregulated PA 12 with Addition of Suspension S5

The procedure was analogous to Example 1. 17.4 kg of suspension S5 were used.

EXAMPLE 8

One-Stage Reprecipitation of Unregulated PA 1010 with Addition of Suspension S2

In accordance with Example 1, 50 kg of a PA 1010 specimen obtained by polycondensation of 1,10-decanediamine and sebacic acid and having the following characteristic data are reprecipitated:
$\eta_{rel}$=1.84, [COOH]=62 mmol/kg, [NH$_2$]=55 mmol/kg.
Compared to Example 1, the precipitation conditions were modified as follows:
Precipitation temperature: 120° C., precipitation time: 2 hours, stirrer speed: 90 rpm
17.4 kg of suspension S2 were used.

EXAMPLE 9

One-Stage Reprecipitation of Unregulated PA 1012 with Addition of Suspension S2

In accordance with Example 1, 50 kg of a PA 1012 granule specimen obtained by polycondensation of 1,10-decanediamine and dodecanedioic acid and having the following characteristic data are reprecipitated:
$\eta_{rel}$=1.76, [COOH]=46 mmol/kg, [NH$_2$]=65 mmol/kg.
Compared to Example 1, the precipitation conditions were modified as follows:
Dissolution temperature: 155° C., precipitation temperature: 123° C., precipitation time: 40 minutes, stirrer speed: 110 rpm
17.4 kg of suspension S2 were used.

EXAMPLE 10

One-Stage Reprecipitation of Unregulated PA 1012 with Addition of Suspension S2

In accordance with Example 1, 400 kg of a PA 1012 granule specimen obtained by polycondensation of 1,10-decanediamine and dodecanedioic acid and having the following characteristic data are reprecipitated:
$\eta_{rel}$=1.80, [COOH]=3 mmol/kg, [NH$_2$]=107 mmol/kg.
Compared to Example 1, the precipitation conditions were modified as follows:
Dissolution temperature: 155° C., precipitation temperature: 117° C., precipitation time: 60 minutes, stirrer speed: 110 rpm
17.4 kg of suspension S2 were used.

TABLE 1

| | $\eta$-rel | BET (m$^2$/g) | <10% | <50% | <90% | AD g/l |
|---|---|---|---|---|---|---|
| Example 1 | 1.69 | 12.3 | 16 | 33 | 55 | 383 |
| Example 2 | 1.67 | 16.3 | 15 | 28 | 51 | 344 |
| Example 3 | 1.70 | 19.70 | 12 | 36 | 70 | 431 |
| Example 4 | 1.68 | 15.3 | 12 | 29 | 52 | 382 |
| Example 5 | 1.68 | 19.3 | 17 | 41 | 80 | 320 |
| Example 6 | 1.64 | 20.3 | 17 | 42 | 74 | 310 |
| Example 7 | 1.68 | 15.3 | 14 | 29 | 53 | 380 |
| Example 8 | 1.82 | 15.7 | 21 | 36 | 75 | 381 |
| Example 9 | 1.75 | 17.1 | 19 | 34 | 76 | 379 |
| Example 10 | 1.79 | 16.5 | 23 | 42 | 73 | 370 |
| Comp. Ex. A | 1.60 | 2.60 | 78 | 137 | 211 | 432 |
| Comp. Ex. B | 1.81 | 2.1 | 50 | 78 | 120 | 440 |
| Comp. Ex. C | 1.79 | 2.5 | 50 | 96 | 210 | 480 |
| Comp. Ex. D | 1.61 | 2.8 | 32 | 71 | 101 | 493 |

$\eta$rel = specific viscosity as a measure of the molecular weight;
BET = surface area of the polyamide powder in m$^2$/g;
<10% = integral particle size distribution at which 10% is below the diameter specified;
<50% = integral particle size distribution at which 50% is below the diameter specified;
<90% = integral particle size distribution at which 90% is below the diameter specified;
AD = apparent density of the polyamide powder in g/l Preparation and Characterization of Granule The powders from Examples 1 and 3 and Comparative Example A were melted, extruded and granulated in a Coperion ZSK 25 twin-screw extruder at 220° C. and a throughput of 8 kg/h.

Subsequently, standard specimens were produced by injection moulding and the tensile test to ISO 527 and the impact resistance to ISO 179 1e/U at 23° C. and −40° C. were determined.

The results are summarized in Table 2.

TABLE 2

| Characteristic value | Example 1 | Example 2 | Example A |
|---|---|---|---|
| Modulus of elasticity MPa | 1821 | 1790 | 1471 |
| Tensile strength at the yield point N/mm$^2$ | 51 | 49 | 46 |
| Yield stress % | 4.5 | 4.9 | 5.2 |
| Breaking strength N/mm$^2$ | 37 | 38 | 36 |
| Elongation at break % | 150 | 210 | 210 |
| Impact resistance 23° C. kJ/m$^2$ | 9 x no break | 10 x no break | 8 x no break |
| Impact resistance −40° C. kJ/m$^2$ | 8 x no break | 8 x no break | 4 x no break |

Modulus of elasticity, tensile strength, breaking strength, yield stress and elongation at break were determined in the tensile test to ISO 527.

Impact resistance was determined to ISO 179 1e/U.

It is evident that specimens obtained with polyamide powders prepared in accordance with the invention possess a higher modulus of elasticity and also higher tensile strength values.

The invention claimed is:
1. A process for preparing an ultrafine powder based on a polyamide comprising preparing a suspension by suspending inorganic particles in an alcoholic medium with introduction of an energy input of greater than 1000 kJ/m$^3$, contacting the polyamide having a relative solution viscosity $\eta_{rel}$ in a range from 1.5 to 2.0, measured in a 0.5% m-cresol solution at 25° C., with the suspension under the action of pressure and/or temperature to generate an at least partial solution, and then precipitating the polyamide from the at least partial solution, wherein the suspension is prepared by, prior to introduction of an energy input of greater than 1000 kJ/m$^3$, forming a presuspension of the inorganic particles in the alcoholic medium with introduction of an energy input of less than 1000 kJ/m$^3$, dividing the presuspension into at least two substreams, these substreams are placed under a pressure of at least 500 bar in a high-energy mill, decompressed through a nozzle and allowed to meet one another in a gas-or liquid-filled reaction chamber, and high-energy grinding is optionally repeated at least once.

2. The process according to claim 1, wherein the inorganic particles have a mean size of the inorganic particles $d_{50}$ in a range from 0.001 to 0.8μm, measured in the suspension in the alcoholic medium as a volume-weighted median value of a peak analysis by means of static or dynamic light scattering.

3. The process according to claim 1, wherein the suspension of the inorganic particles is at least one selected from the group consisting of $Al_2O_3$, $TiO_2$, $ZrO_2$, $SiO_2$, $ZnO$, $Bi_2O_3$, $CeO_2$, ITO, ATO, IZO, boron nitride, boron carbide, mixed oxides and spinels, suspended in the alcoholic medium.

4. The process according to claim 1, wherein the suspension has a content of the inorganic particles in a range from 10 to 60% by weight, based on the total weight of the suspension.

5. The process according to claim 1, wherein the suspension is obtained by suspending the inorganic particles having a specific surface area in a range from 5 to 200 m$^2$/g in the alcoholic medium.

6. The process according to claim 1, wherein the suspension is obtained by suspending the inorganic particles in the alcoholic medium in the presence of a stabilizing additive or of a mixture of additives selected from the group consisting of phosphoric acid, mono- or dibasic phosphates, phosphoric esters, phosphonic acids, organically modified phosphonic acids, sulphuric acid, sulphuric acid derivatives, nitric acid, organic mineral acids, organic compounds having one or more acidic protons, carboxylic acids, phenols, basic organic compounds and amines.

7. The process according to claim 1, wherein the alcoholic medium is one or more alcohols which have a numerical ratio of oxygen atoms to carbon atoms in a range from 1:1 to 1:5.

8. The process according to claim 7, wherein the alcoholic medium is ethanol.

9. The process according to claim 1, wherein the suspension of the inorganic particles is at least one of $Al_2O_3$.

10. The process according to claim 2, wherein $d_{50}$ is in a range from 0.005 to 0.5μm.

11. The process according to claim 2, wherein $d_{50}$ is in a range from 0.01 to 0.3μm.

12. The process according to claim 1, wherein the ultrafine powder has a specific BET surface area in a range of 5-100 m$^2$/g; a fineness $d_{50}$ of less than 70μm; an apparent density AD in a range from 250 to 1000 g/l; and a particle content of from 0.1 to 80% by weight of the inorganic particles based on the total weight of the polyamide powder.

13. The process according to claim 12, wherein the specific BET surface area in a range of 10-25 m$^2$/g; the apparent density AD in a range from 250 to 800 g/l; and the particle content is from 1 to 60% by weight of the inorganic particles based on the total weight of the polyamide powder.

14. The process according to claim 12, wherein the apparent density AD in a range from 300 to 500 g/l.

15. The process according to claim 1, wherein the introduction of an energy input of greater than 1000 kJ/m$^3$ is carried out with a planetary kneader, rotor-stator machine, stirred ball mill or roll mill.

* * * * *